United States Patent [19]

Ascarelli et al.

[11] Patent Number: 4,652,497

[45] Date of Patent: Mar. 24, 1987

[54] ORGANOSILOXANE COMPOSITIONS FOR ABRASION RESISTANT AND ADHESION PROMOTING PROTECTIVE COATINGS

[75] Inventors: Paolo Ascarelli, Rome; Gianfranco Boccalon; Mario De Antoniis, both of Monterotondo, all of Italy

[73] Assignee: AGIP S.p.A., Milan, Italy

[21] Appl. No.: 682,178

[22] Filed: Dec. 17, 1984

[30] Foreign Application Priority Data

Dec. 27, 1983 [IT] Italy ............................. 24393 A/83

[51] Int. Cl.⁴ ................................................. B32B 9/04
[52] U.S. Cl. ...................................... 428/447; 528/12; 528/25; 528/20; 528/29; 528/38; 556/413; 556/424; 524/795; 524/792; 524/858; 524/860
[58] Field of Search ...................... 528/29, 38, 12, 25, 528/20; 556/413, 424; 428/447; 524/759, 792, 858, 860

[56] References Cited

U.S. PATENT DOCUMENTS

| | | | |
|---|---|---|---|
| 3,792,073 | 2/1974 | Prokai | 528/29 |
| 4,113,665 | 9/1978 | Law et al. | 528/29 |
| 4,408,031 | 10/1983 | Holtschmidt et al. | 528/29 |

OTHER PUBLICATIONS

Merk Index, 1976, (Merk and Co. Inc.), pp. 8238 and 9405.

*Primary Examiner*—Melvyn I. Marquis
*Attorney, Agent, or Firm*—Morgan & Finnegan

[57] ABSTRACT

This invention relates to organosiloxane compositions which have application as protective coatings for soft substrates. The compositions of the invention include a substituent selected from each of the following classes of compositions: organo-alkoxysilanes; polyoxymethylenes; monocarboxylic organic acids; and optionally inorganic hydroxyacids. The coatings formed form these compositions have properties as adhesion promoters and are abrasion resistant.

35 Claims, 2 Drawing Figures

ORGANOSILOXANE COMPOSITIONS FOR ABRASION RESISTANT AND ADHESION PROMOTING PROTECTIVE COATINGS

The present invention relates to organosiloxane compositions suitable to produce transparent and abrasion resistant protective coatings; a method is described for preparing these compositions, which can be used as thermosetting paints, so as to obtain transparent, uniform and solvent resistant coatings. Such coatings are useful for the purpose of coating and protecting soft substrates, such as organic polymers, to which the coatings are connected by means of direct adhesion.

The compositions according to the present invention are obtained from the reaction product of aminoalkylalkoxysilanes and alkyl-aminoalkyl-alkoxysilanes with a reactive polyoxymethylene polymer; the silane in the composition is present in a partly hydrolized form, so as to generate silanol groups.

The compositions are completed with a thinner solvent and an acid, a part of which consists of an inorganic hydroxyacid, or acidic hydroxylated compound capable of forming stable bonds by means of condensation with silanols.

The compositions are applied on the surface of the substrate, and thermally set as insoluble coatings firmly bound to said substrates.

Coatings of this type confer to the subtrate properties of compatibility and adhesion for further coatings, thus rendering it possible to obtain multi-layer items, not obtainable by means of direct adhesion on the same substrates in the absence of such a coating.

It is well known that certain organic polymers, such as e.g. polycarbonate, polymethylmethacrylate, polyvinyl chloride, polyester and so on, have acceptable optical characteristics, good mechanical properties, such as impact strength and low specific gravity, so as to be able to be advantageously used as a glass substitute.

Unfortunately some undesirable surface properties, among which are low abrasion resistance, easy attack by solvents, and more generally, insufficient resistance to atmospherical agents limit uses of or render such organic polymers not very useful in applications in which both abrasion resistance and solvent resistance, in addition to impact strength are all necessary.

To obviate these drawbacks, many methods have been proposed.

Some methods use the deposition in vacuum of thin inorganic coatings, such as $SiO_2$, $Al_2O_3$, $ZrO_2$, as mentioned in U.S. Pat. Nos. 3,458,342 and 3,522,080.

This method is very expensive, and requires a long period of time to obtain a layer of thickness greater than 1 micron which is sufficiently resistant to abrasion. There is moreover an intrinsic disadvantage due to the different coefficient of thermal expansion between the organic polymer substrate and the inorganic coating and for this reason, temperature changes cause spontaneous delaminations of the coating.

Other methods are known in which organofunctional silanes, also known as "coupling agents", are used to obtain protective coatings.

In U.S. Pat. No. 3,451,836 e.g., a coating of substrates of polycarbonate or of polymethylmethacrylate is proposed by applying onto them a composition consisting of a mixture of methyltriethoxysilane and of phenyltriethoxysilane, and then effecting hardening of the coating.

The resulting coating has poor abrasion resistance and is therefore of limited usefulness.

U.S. Pat. No. 3,642,681, discloses use of compositions on the base of polysilicic acid, practically of hydrolysed and partly condensed tetraethoxy-silane, mixed together with esters of hydrolyzed silanes as thermosetting protective paints.

In U.S. Pat. No. 3,986,997 the use is disclosed of paints consisting of a dispersion of colloidal silica in a hydroalcoholic solution of a silanol, mainly consisting of partly condensed $CH_3$—$Si(OH)_3$.

The compositions of the types mentioned above produce coatings showing adequate abrasion resistance but, although strongly adherent to inorganic substrates such as glass or metal, their adhesion to organic polymers may be inadequate; e.g., the adhesion to polycarbonate and to poly-methyl-methacrylate is insufficient or not long lasting in the absence of a suitable primer coat.

A primer useful for this purpose is disclosed in U.S. Pat. No. 4,127,697, in which the use is proposed of -aminopropyl-triethoxysilane in hydroalcoholic solution, to the purpose of treating the surface of polycarbonate. A uniform and thin layer is so obtained, which promotes adhesion towards paints or compositions on a base of hydrolysed organo-alkoxy-silanes which act as top coatings.

The treatment proposed is of limited utility. To avoid altering the optical quality and the transparence of substrates a very careful and delicate coating technique, to obtain an even covering of 1-10 molecular layers is required. Such accuracy can be obtained only on small items, e.g., lenses.

A composition provided with adhesion characteristics and abrasion resistance is disclosed in U.S. Pat. No. 4,042,749; it consists of a mixture of reactive silanes and metal-esters, such as tetraalkyltitanates or tetraalkylzirconates.

Both types of compounds are used without preliminary hydrolysis and the silanes are selected from carbofunctional silanes, containing i.e., an unsaturated or an epoxide group.

The composition is spread on the substrates, and submitted to a curing step either by exposure to U.V. rays, or by heating.

The compositions of this type suffer from the drawback that they must be used immediately, practically as soon as they are prepared because they are very moisture sensitive, thus their storage may result in problems.

The present invention provides for compositions whose usefulness is not so limited by the drawbacks mentioned. Compositions of the present invention produce coatings of high transparence, uniformity and abrasion resistance; they have very good adhesion characteristics to synthetic organic polymers to which they adhere without the need of a primer; they show moreover optimum spreading characteristics on large surfaces, using presently known painting techniques; and they possess optimum storage characteristics, even for months, maintaining their full efficiency.

The compositions according to the present invention have the further advantage of promoting adhesion of substrates coated with them with other coatings, such as vacuum-deposited coatings, thermoplastic adhesives or plasticized adhesives, which otherwise would not adhere to, or would attack the unprotected surface, e.g. the adhesives used for laminating glass.

The compositions disclosed are useable also as primers, to obtain multi-layer transparent items. In particular, it is possible to obtain laminates or coupled items of organic polymers and glass and in particular of polycarbonate and glass, by using plasticized polybutyral.

The composition useful for the coatings according to the present invention is obtained from the partial reaction or from the total reaction of a component (A), an organosilane of a basic type, i.e., containing a functional basic group of a primary or secondary amine type, with the component (B), of a polyoxymethylene type.

The composition is completed by diluting the reaction product within a diluted acidic solvent, in which the acidic component (C) is an organic acid, or a mixture of organic acids; optionally, a portion of said acid may be substituted by an inorganic hydroxyacid (component D).

The (A) component, i.e., the reactive organo-functional silane of the invention is selected from organo-alkoxy-silanes containing at least a nitrogen-bearing functional group of basic type, and may be represented by the general formula (1):

(1)

in which: X is a divalent radical selected among arylenic or alkylenic radicals of from 1 to 10 carbon atoms, preferably X may be e.g. $-(CH_2)_m-$, m being not lower than 1 and up to 10.

The radicals represented by R' may be selected among monovalent hydrocarbon radicals, or among aryl and alkyl saturated and unsaturated radicals, possibly also halogen-substituted. R' may also be hydrogen.

R' is preferably selected among hydrogen, alkyl radicals containing from 1 to 8 carbon atoms, as well as aryl radicals, in particular the phenyl radical.

The radicals represented by R'' are selected among monovalent hydrocarbon radicals, such as alkyl radicals, alkenyl radicals, cyclo-alkyl radicals, aryl radicals. Preferably, as R'', radicals are selected from hydrogen and saturated alkyl radicals are selected from hydrogen and saturated alkyl radicals of from 1 to 8 carbon atoms. The R'' radicals may be halogen substituted.

In the formula (1) of the silane, n can be equal to 0, 1 and 2, preferably to 0 and 1; Z may be selected from hydrogen, monovalent alkyl radicals, or radicals containing a second nitrogen-bearing functional group, such as the amino-alkyl radicals: in this last case, the representative formula may be written as (2):

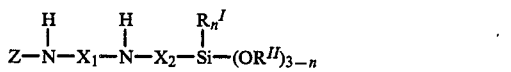

in which $X_1$ and $X_2$ can be the same or different, and are selected from all those radicals which have already been defined as X radicals.

The preferred silanes of the present invention are:
3-aminopropyl-triethoxysilane,
$H_2N-(CH_2)_3-Si-(O-C_2H_5)_3$;
aminomethyl-triethoxysilane,
$H_2N-CH_2-Si(O-C_2H_5)_3$;
2-aminoethyl-aminopropyl-trimethoxysilane,
$H_2N-(CH_2)_2-NH-(CH_2)_3-Si(O-CH_3)_3$;
2-aminoethyl-aminopropyl-methyl-dimethoxysilane,

Polymers useful as component (B) are selected from both cyclic and linear polyoxymethylenes, and polyoxymethyleneglycols.

In particular, polymers of formula $(CH_2O)_n$ may be used as component (B), such formula representing a cyclic polymer in which n is either equal to or higher than 3; for n=3, such product is named trioxane or tri-oxymethylene, for n=4, tetraoxane, and so on.

In general, reactive polymers of general formula

are useful, in which R' and R'' are generally alkyl groups or hydrogen, and m is generally greater than 6, and may be as high 100.

As previously stated, the (A) component and the (B) component must be reacted with each other, in weight ratios of generally 100 parts of silane (A) to 3-12 parts of (B).

The molar ratio between the components is selected in such a way, that the reaction product is the result of the conversion of from at least 15%, to 100% of silane moles, calculating the moles of component (B) on the basis of the unit of molecular weight is equal to 30, relative to the formula $-(CH_2O)-$.

Said molar ratio, expressed as (B)/N, i.e., as the ratio of the component (B) to the total nitrogen present, must be comprised within the range of from 0.15 to 1.2; and preferably within the range of from 0.45 to 0.99.

The component (A) may be moreover one or a mixture of the previously mentioned silanes, and the component (B) may be one or a mixture of polyoxymethylenes or polyoxymethyleneglycols.

The reaction takes place by simply dispersing the polymer to be reacted, as a fine powder, within the liquid silane, in the absence of solvents. Alternatively, the reaction may take place in the presence of a solvent which is inert in the present reaction, e.g., suitable solvents are selected among ethers, aliphatic and cycloaliphatic hydrocarbons, aliphatic alcohols, chlorinated and fluorinated hydrocarbon solvents, esters, amides additionally silanes and alkyl-alkoxysilanes are useful as solvents, which may be represented by the formula $R_n'-Si(OR'')_{4-n}$, in which R' and R'' are as defined for formula (1) above, and alkyl-acyloxysilanes.

The reaction takes place at a temperature within the range of from 5° to 70° C., and preferably from 12° C. to 50° C. The reaction is carried out in a reaction vessel maintained under an inert atmosphere, free from moisture.

The direct reaction between the basic silane and the polyoxymethylene is self-catalyzed and leads to the formation of polymers, as it is shown by the evident increase of viscosity of the reaction medium.

The reaction is allowed to proceed for 30 minutes to 5 hours, checking the medium viscosity increase, so that said viscosity is increased to more than 5 centipoise, when measured at 27° C. but does nor exceed 30 centipoise. The reaction is then stopped. A suitable process for stopping the reaction consists of cold-diluting the reaction product (A+B) in a diluting bath formed by a solvent or by a blend of solvents, containing an organic acid (component C) or a mixture of an organic and an inorganic acid (component D) dissolved therein at a suitable concentration and possibly additionally comprising a suitable quantity of water.

The acidic solvent acts in this way as a diluent, and its volume generally forms from 1 to 6 parts of the end product composition.

Solvents suitable for the end composition include solvents of silane and the reaction product of the silane and polyoxymethylene. Other solvents include all those solvents, which can be used for the reaction to take place between component (A) and component (B) as described above.

Some precautions must be however adopted for treating the surface of organic polymers to preserve their transparence characteristics. Namely, the solvent must not attack the surface to be coated, and at the same time is must possess a low surface tension, so as to adequately wet the surface, and to allow an even spreading of the coating. Solvents having such characteristics, and low surface tension are selected among ethers, alcohols, hydrocarbons both of the aliphatic and cycloaliphatic types, fluorinated hydrocarbons and their blends, silanes and alkoxysilanes.

Solvents are generally used having a boiling temperature lower than 100° C., and containing from 1 to 8 carbon atoms.

In particular, resins such as polycarbonate, polymethylmethacrylate, and the aliphatic alcohols containing from 1 to 5 carbon atoms are preferred, including methanol, ethanol, isopropanol, n-butanol and their blends are useful as solvents.

Solvents such as chlorinated hydrocarbons, ketones, aromatics, esters, even if they are not preferred, may be used in minor quantities, in general lower than 10%, as blends with the preferred solvents.

The water content of the end composition must be adjusted in such a way, as to allow the partial hydrolysis to take place of alkoxyl groups bound to the silicon atoms of the silane. In principle, the water content must be calculated on a stoichiometric basis to be able to hydrolyze the silane to the corresponding silanol. It is preferable that the amount of water be adjusted within the range of from 25% to 75% of the stoichiometrically calculated amount.

The concentration of organic carboxylic acid, the component (C) is selected such that the value of pH of the end composition is lower than 7 and is preferably comprised within the range of from 3 to 6 (such pH value being measured on a hydroalcoholic solution obtained by mixing 1 part of the solution with 1 part of distilled water).

The concentration is adjusted such that the acid forms a percentage of from 6% to 20% by weight of diluting solvent, and more precisely, the ratio of all carboxylic acid equivalents to nitrogen atoms, (—COOH/N), is selected in such a way that its value is comprised within the range of from 0.75 to 2.5 and preferably comprised within the range of from 1.2 to 2.0.

The acid, which, according to the present invention, is a fundamental constituent of the compositions, has two functions: on one side, it must keep the composition pH low enough, to allow the paint to have good storage characteristics; and on the other side, it has subsequently the function of controlling the catalysis of the condensation process of silanol groups, SiOH, into siloxane bonds, i.e., of the type Si—O—Si.

The formation of these type of bonds, as demonstrated by I.R. Absorption spectra, accompanies the phenomenon of the thermosetting of the coating to form an insoluble and abrasion resistant coating.

In the composition of the present invention a first part of added acid is in the form of proton bearing acid, and this part is foreseen to leave the composition together with the greater part of the solvent, soon after application of the composition on the surface of the substrate; a second part is contained in a dissociated form, releasing protons to the basic groups present within the composition.

This second part of the acid is bound within salified amines, which act as "latent catalysts" of the setting process, which takes place at high temperature. At high temperature the acid is dissociated and if it is volatile it leaves the coating, thus, liberating the amine groups which are the active catalytic species of the condensation of silanols to form siloxane bonds (polymerization by hydrolysis).

Suitable acids, according to the purposes described above, are all those organic monocarboxylic acids, hydroxyacids, aldehydic and ketonic acids of from 1 to 4 carbon atoms, optionally halogen-substituted, which are volatile enough to evaporate at the temperature at which the coating is applied and then thermoset on the substrate or which are decomposed to volatile breakdown products which will evaporate when they are submitted to those conditions.

The optionally halogenated acids containing 1 or 2 carbon atoms are preferred. These preferred acids include formic acid, acetic acid, chloroactic acid, dichloroacetic acid, trichloroacetic acid, fluoroacetic acid, difluoroacetic acid, trifluoroacetic acid, glyoxylic acid, and glycolic acid.

The acids which are suitable to act as "latent catalysts" can be (a) the same monocarboxylic acids above mentioned; (b) monocarboxylic organic acids, with more than 4 carbon atoms and polycarboxylic acids; (c) inorganic hydroxyacids e.g. phosphoric acid, or boric acid; (d) silicic acid (hydrated silica), and more generally all those hydroxylated compounds of acidic character, among which the (D) component is selected, and which may be represented by the formula (3):

Said hydroxylated compounds are selected from those compounds which are capable of reacting at high temperature with silanol groups, SiOH, to give stable Si—O—M bonds, so that the compound (component D), by reacting, becomes a part of the coating.

In formula (3), $m+n$ may have the value 3 or 4, R is generally an alkyl of from 1 to 4 carbon atoms, or it can be hydrogen or an acylic group, M can be boron, silicon, phosphorus, titanium, aluminum, zirconium, tin, antimony, arsenic.

The content of (D) component is selected such that the atomic ratio of M to all present nitrogen (M/N) is not lower than 0, and equal or not higher than 0.39 (0 M/N=0.39).

Relative to the organic acid, the content of the D component may be as high as 18%, calculating the molar ratio with reference to acidic carboxyl equivalents (M/COOH).

When the composition has been prepared, it can be applied immediately; before using it, it is however preferable to keep it stored for at least 7 days at room temperature under agitation.

At the moment of its use, the composition must be accurately filtered to remove any suspended particles, or precipitated matter, which would create faults in the coating.

The coating process on the substrates may be conveniently carried out by means known to anyone knowledgeable of paint deposition techniques, such as dip coating, spray coating, or additionally, flow coating, roll coating or spin coating techniques.

In the particular case of flat sheets, even of large dimensions, the preferred technique of application is by dipping.

To achieve good optical characteristics of coated substrates, it is suitable to carry out the necessary operations in a dust free environment, with relative humidity of not more than 40%, and preferably within the range of from 20% to 30%.

Before being painted the substrates must be carefully cleaned, deprived of dust and perhaps degreased. A suitable cleaning process consists of first cleaning by ultrasound in a water-soap bath, followed by a thorough washing with deionized water, then washing in isopropanol and finally washing with a mixture of isopropanol and a freon type fluorocarbon in the presence of ultrasound.

After the application of a uniform paint layer, it is preferable to allow the substrates to stand at least 15 minutes within an environment at a temperature comprised within the range of from 22° C. to 32° C., to dry the deposited layer before the evaporation of the greater part of the solvent, and volatile acids. After drying, the coating is hardened at temperatures generally higher than 80° C. but lower than the softening temperature of the organic polymer substrates being used.

In general, from 35 minutes to 120 minutes are enough for achieving a satisfactory setting; these times may be reduced if the process is carried out at high temperature in a vacuum.

The thickness of the coating can be varied, depending on the viscosity of the solution, and of the particular painting technique adopted, to obtain thicknesses of up to 15 microns, and preferably comprised within the range of from 1 to 7 microns.

As above-mentioned, the compositions are especially useful for coating organic polymers of the types generally used for producing sheets, films or transparent items, in particular flat or curved sheets, or cellular sheets.

These polymers include aromatic polycarbonates, such as e.g. poly-(diphenyl-2,2'-propane-carbonate), and aliphatic polycarbonates, such as poly-(diethylene glicol-bisallyl-carbonate); polyacrylates, polymethacrylates, such as polymethylmethacrylate, polyesters such as e.g. poly(ethyleneterephtalate).

Other polymers which can be coated with the protective coating of the invention are the esters of cellulose such as cellulose acetate, propianate and butyrate; polyacetals, polyamides, polyvinylchloride, polysulphone, polyethersulphone, polystyrene and copolymers of styrene with actylonitrite and acrylonitrile--butadiene. The coated articles are in the form of sheets, films or plates and are of flat as well as of curved shape, or are cellular sheets. The coated articles are useful as windows, protective shields, and more generally, items of this type may be employed in construction and building and in the transportation industry.

Such items, in particular the sheets, may be usefully employed for preparing multilayer items, such as laminated sheets composed, e.g., by polycarbonate and glass. Such an advantageous application of the coated items derives from the property shown by the coatings, of promoting the adhesion to those plasticized thermoplastic adhesives which are commonly used for laminating glass onto glass. In particular, as it is shown by the following examples, the polycarbonate is advantageously suitable to be laminated with glass by using as the adhesive e.g. the plasticized polyvinylbutyral, without any phenomena of opacification of the polymer by the adhesive which may happen in the absence of such coating.

At the same time, the adhesion of polyvinylbutyral to polycarbonate is increased so as to obtain multi-layer items, in which, the organic polymer is firmly bound to glass by means of an interposed adhesive. Multi-layer objects of this type are usefully employed as impact resistant or break-through resistant glasses, in that the mechanical properties of the polymer are not altered by the coating process according to the present invention.

In the following examples, an advantageous application is additionally described of the coating of the invention, as a primer coating for obtaining multilayer items having the structure polymer/primer/top coat in which the top coat in the absence of a primer does not have a satisfactory adhesion to the substrate, or even if it has a certain degree of adhesion to it, said adhesion is not long lasting. This is the case of inorganic vitreous coatings vacuum deposited and siloxane-vitreous coatings, containing i.e. a substantial amount of colloidal silica, such as those disclosed in U.S. Pat. No. 3,986,997 or in U.K. Pat. No. 1,596,151.

Coatings of this type, as previously mentioned possess an adequate abrasion resistance. In particular, a thin layer of $SiO_2$, vacuum deposited, of a few microns of thickness, can be in principal an ideal coating, in that it has an abrasion resistance which cannot be distinguished from that of glass. When said deposition is coated directly on the substrate, e.g. of polycarbonate or of polymethylmethacrylate, two substantial drawbacks occur: either the adhesion is insufficient, or even if at the moment of deposition an adhesion is obtained, such adhesion is not long lasting, and spontaneous delamination may occur because the two materials possess two different coefficients of thermal expansion.

The use of the compositions of the present invention as primer coating allows the above-mentioned top coat to be applied, fulfilling both the requisite of a good adhesion, and the requisite of an improved compatibility of the thermal expansion coefficients, in this way rendering more durable the multilayer items which can be obtained.

EXAMPLES 1-4

Figure 1:
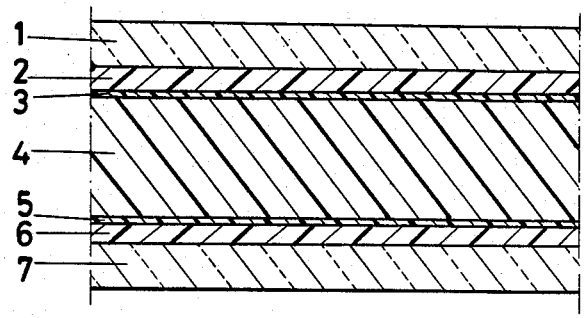
FIGS. 1 and 2 illustrate laminates obtained from the coating of polycarbonate sheets, plasticized polyvinylbutyral and glass sheets.

In a reaction vessel of 500 ml of capacity, thermostatized at a temperature of 32° C, 190 g were introduced of γ-aminopropyltriethoxysilane. Under stirring, 12 g of trioxane, $(CH_2O)_3$ were added, such that the molar ratio $CH_2O/NH_2$ was 0.47.

The stirring was increased to obtain a complete suspension of the powder inside the liquid.

The trioxane was allowed to react until it completely dissolved, i.e., until the solution became clear again and its viscosity reached the value of 17.7 centipoise.

At this moment the reaction was stopped by pouring the viscous product inside a diluting bath, kept cooled at 5° C., and consisting of 340 ml of ethanol, 8 ml of acetic acid, 2.6 g of phosphoric acid, and 21 g of water.

The resultant composition was left at room temperature and under stirring for three days; at this moment, it was filtered and stored at 4° C. for 25 days before being used. The composition did not show traces of precipitated or gelified matter after 6 months from its preparation.

A second composition (composition 2) was prepared by reacting 160 g of a 1:1 mixture of γ-aminopropyl-triethoxysilane and of 2-aminoethyl-aminopropyl-trimethoxysilane, with a mixture of polyoxymethylenes consisting of 12 g of paraformaldehyde, $H\text{-}(OCH_2)_m\text{-}OH$, the value of m ranging from 20 to 80, and of 6 g of trioxane, so that the ratio of $CH_2O/NH_2$ reactants was 0.91. The reaction was carried out by thermostatizing at 22° C. and diluting the resultant product in a dilutant similar to composition 1, in which the phosphoric acid was replaced by 2.5 g of boric acid, $B(OH)_3$. Also this solution was stored and used in parallel to the preceding one. For comparison purposes, both reactions were repeated using twofold quantities of polyoxymethylenes, i.e., using respectively 24 g of trioxane (composition 3) and 24 g of paraformaldehyde (composition 4).

Reaction ratios were used of $CH_2O$ equivalents to $NH_2$ equivalents much higher than 1.

The resulting compositions showed a decreased stability, in that they gelled within three days after having been prepared.

EXAMPLES 5-11

The compositions 1 and 2 of preceding Examples were used for painting samples of polycarbonate, having the form of square slabs with a side of 15 cm, and a thickness of 3 mm, obtained by injection moulding of a commercial material sold under the trade name IN-VET ®251/01. The painting was carried out 30 days after the preparation date of the compositions, and was later on repeated after an additional 90 days. The painting of the specimens was carried out at 20° C., in a moist environment maintained at a relative humidity of 28%, by means of the dipping technique, moving the sheets at the speed of 115 cm/min.

Each specimen was exposed to the atmosphere for 15 minutes, and then thermoset in an oven at 120° C. for 1.5 hours.

Coatings were obtained with thickness of 4-5 micron, such coatings being uniform, transparent and free from faults.

For comparison purposes, similar specimens were painted with the same process, with a composition (composition 5) prepared by diluting 190 g of γ-aminopropyl-triethoxysilane in an acidic diluting bath of the same composition as described in Example 1 however omitting polyoxymethylene.

Still for comparison purposes, a composition of basic type (composition 6) was prepared, by repeating the reaction of Example 1, and diluting the reaction product with only acid-free solvent.

Both comparison compositions (composition 5 and composition 6) were stored and used in parallel to compositions 1 and 2 on polycarbonate slabs.

In all cases, on the painted specimens the properties of the coatings were checked, such as the transmittance, the adhesion, the abrasion resistance, and the resistance to acetone.

The transmittance was measured by using a Haze-Meter Gardener instrument.

The adhesion to the substrates was measured by cutting on the surface 100 squares of sides of 1 mm, having care that the depth of the notches were higher than the thickness of the coating.

On notched squares, a section was applied of adhesive tape "Scotch" type, Brand Magic Transparent Tape No. 810 (3M). After having applied a strong pressure, the tape was abruptly raised, tearing it off at an angle of 90° relatively to the surface of the specimen. The adhesion is thus evaluated with a rating of from 0 to 100, depending on the number of withdrawn squares after 3 repeated tests.

The resistance to abrasion was determined according to ASTM D 1044 method, by means of a Taber abrasion meter, using CS-10F grinding wheels under a load of 500 g, measuring the increase of haze (4H%) after 100 cycles by a Gardener Haze-Meter.

The resistance towards acetone was evaluated by applying on the surface a cotton flock soaked with solvent. After 15 minutes the presence or lack of attack points was verified; should no alterations have been observed, the test was continued up to 30'. The test is considered to have been passed, if no alterations of the surface are observed after this contact time with the solvent. The rating is given by means of a (+) or of a (−) sign.

As shown in Table 1, only the complete preparation process of compositions 1 and 2 allows fully efficacious paints to be obtained, i.e., paints operating for long times without altering the properties of the coatings obtainable from them by thermosetting.

EXAMPLES 12-15

A quantity of 100 g of γ-aminopropyltriethoxysilane was reacted with 8 g of trioxane, at a temperature of 32° C., according to the process described in Example 1.

The reaction product (viscosity 15.7 centipoise at 26° C.) was immediately diluted with a diluting bath consisting of 80 g of methyl-triethoxysilane, 100 ml of methanol, 100 ml of ethanol, 40 ml of glacial acetic acid, 2.3 g of phosphoric acid, 21 g of water. Such diluting bath had been prepared 24 hours before being used, to obtain the composition as discussed.

The solution was kept under stirring for 5 days at room temperature, then it was filtered, diluted further with 200 ml of ethanol containing 2.5% of water.

The end composition (composition 7) was kept stored at 4° C. and used after 30 days, and then after 90 days for painting square specimens of 10 cm × 15 cm of polycarbonate (PC), polymethylmethacrylate (PMMA) and polystyrene (PST).

The hardening of the coating was carried out at 115° C. for 1.5 hours on PC, at 87° C. for 4 hours on PMMA and on PST.

For comparison purposes, a similar composition, No. 8 was prepared, by using the same silanes, but omitting the reaction with polyoxymethylene.

The results are compared in Table II, where it is confirmed that a uniform adhesion to the substrates, and a perfect transparence of the coating cannot be obtained if the reaction omits the aminosilane with polyoxymethylene.

The noticeable endurance is also evidenced by the efficaciousness of the compositions months after their preparation.

EXAMPLES 16–19

A mixture of 400 g of γ-aminopropyl-triethoxysilane and 100 g of aminomethyl-triethoxysilane is reacted with 42 g of trioxane following the process of Example 12.

Separately, and preliminarily, a thinning bath had been prepared by cold mixing 500 ml of triacetoxy-vinylsilane with 2.000 ml of a blend of methanol/ethanol 1:3 containing 60 g of water, and 12.5 g of phosphoric acid.

The diluting bath was left standing 18 hours at room temperature before being used for diluting the reaction product of aminosilanes with trioxane.

The dilution was carried out by slowly pouring the reaction product inside the thinner, whilst this latter was kept cold at a temperature between 0° C. and 10° C.

The solution obtained, composition 9, was left at 20° C. and under stirring for 7 days, then it was filtered, further diluted with 3.000 ml of solvent methanol/ethanol mixture 1:3 and stored at 10° C. for 30 days before being used to the purpose of painting samples of polycarbonate, obtaining a first coating layer, or primer coating, of 1 to 2 micron in thickness.

Specimens of this type, having dimensions of 15 cm×15 cm, were subsequently painted by means of dipping into a composition filled with colloidal silica and on the basis of hydrolyzed methyl-triethoxysilane.

Such composition, which was used here as a top coat, was obtained by following the procedure hereunder:

100 g of an aqueous suspension of colloidal silica, containing 28% by weight of $SiO_2$ present as particles of dimensions of from 11 to 15millimicron, were acidified at pH 3.5 with glacial acetic acid.

To this suspension 180 g were slowly added of methyl-triethoxysilane, keeping the temperature at from 5°–10° C. The pH was controlled at 3.5 by means of the addition of small quantities of acetic acid.

At the end of the addition, the suspension was left at room temperature for 24 hours, to allow the complete hydrolysis of the silane.

The suspension was then diluted with 500 ml of a solvent consisting of an ethanol/isopropanol mixture in the ratio 1:3, after having been left under stirring for 7 days at room temperature, the solution was filtered and then used for painting the specimens which had already been painted with the primer obtained from composition (9).

For comparison purposes, with the same top coat paint, both polycarbonate samples without primer coating and polycarbonate samples with primer coating were coated, said primer coating having been obtained from a composition equivalent to composition No. 9, but prepared omitting the reaction of amino-organosilanes with the polyoxymethylenes: this composition is referred to as composition (10).

A further comparison was carried out using a simple solution of γ-aminopropyl-triethoxysilane as primer, obtained by dissolving 1 part of silane in 6 parts of methanol containing 6% of water, and waiting 24 hours before using it (composition 11).

On the samples of the four types tests carried out of adhesion of the coatings, and of resistance of the adhesion to accelerated ageing. To this purpose the samples were introduced inside a Weather-O-Meter ® for times of 250 and 500 hours.

The results are compared in Table III, in which it appears clearly that only the primer related to composition (9) allows a long lasting adhesion of organo-siloxane coating.

EXAMPLES 20–23

The compositions of preceding Examples 12 and 16 (i.e., the compositions 7 and 9), and, for comparison purposes, the composition of Example 14 (i.e., composition 8) were used as primer coating on polycarbonate, so as to obtain substrates suitable to be coated with adhesion by a thin layer of glass, $SiO_2$, vacuum deposited.

Samples of 15 cm×15 cm and 3 mm of thickness were coated on one face by means of the evaporation of silicon monoxide. The evaporation was carried out using a graphite melting pot under an atmosphere of $5.10^{-4}$ torr of oxygen: the oxygen guarantees the complete conversion of vapourized monoxide into the dioxide $SiO_2$, which is deposited.

The sample was placed at a distance of 28 cm from the source, and its temperature was maintained within the range of from 52° to 57° C. The deposition rate was controlled so to constantly be of 15° A. per second, obtaining a 3 micron thick coating in a time of 33 minutes.

On the specimens, after the deposition, the adhesion test was performed as described in Example 1; where the adhesion was found to be satisfactory, the abrasion resistance test was also carried out by means of 750 cycles of a Taber abrasion meter, restoring the CS-10F grinding wheels every 150 cycles on restoring disks of the S-11 type.

As the data of Table IVs how, only the primer coat prepared according to the present invention allows $SiO_2$ coatings to be deposited, which are well adherent, and provided with outstanding abrasion resistance. Such a result is to be compared with the behavior of silica deposited on naked (i.e., without any primer) coating; in such a case, the $SiO_2$ coating is spontaneously delaminated as soon as the specimen is withdrawn from deposition chamber.

EXAMPLES 24–26

A cellular sheet of polycarbonate, of dimensions 30 cm×30 cm, of 1 cm in thickness, and with walls of 0.6 mm, was coated on one face using a spray gun with the composition disclosed in Example 1.

For comparison purposes, and by the same method, a sheet of same dimensions was coated with composition 5 of Example 9.

After having hardened the coatings at 110° C. for 65 minutes, the sheets were used to prepare laminated sheets composed of glass sheets of the same dimensions, and of 2 mm in thickness. As the adhesive for bonding the polycarbonate to glass, a sheet was used in both cases of polyvinylbutyral plasticized with triethyleneglycol-di(2-ethylbutyrate), having a thickness of 0.75 mm.

The lamination was carried out by prearranging the three layers, firmly fixed by clamps, inside an oven under reduced pressure of $10^{-1}$ torr, and at 115° C. for 20 minutes.

The samples were subsequently introduced inside an autoclave in air at 13 atm and at 125° C. for 30 minutes.

In this way, transparent and appearingly evenly adhesion bound items were obtained in the form of laminates: cellular PC layer/coating/PVB/glass.

When the coating was not provided, the obtained items were completely opaque, due to the alteration of PC surface.

The resistance of the adhesion in the transparent items was verified by exposing the laminated items to thermal and moisture cycles: the samples were exposed at 70° C. and relative humidity of 95% for 12 hours, and subsequently at 4° C. for a further 12 hours.

The cycles were repeated until opacity or unbinding symptoms appeared.

As it can be seen from Table V, when the polycarbonate is not protected by the coating, the delamination occurs after the first cycle.

Only with the coating of Example 1 a true stability of the laminate was achieved; such stability is however higher than that obtained by means of compositions in which aminosilanes were not reacted with a polyoxymethylene.

In the following Examples a further demonstration is supplied of the stability of the adhesions which can be achieved in laminates in which the polycarbonate is coated by means of the composition disclosed herein before being bound to the glass by means of thermoplastic adhesives, such as polyvinylbutyral.

EXAMPLE 27

The composition of Example 16, i.e., the composition 9, was used to the purpose of coating three samples of polycarbonate, of dimensions 30 cm×30 cm and of 5 mm in thickness, cut out from a sheet manufactured by extrusion of SINVET ® type 273/01.

These samples were used to prepare 3 laminated items, with plasticized polyvinylbutyral, between pairs of glass sheets of 2 mm in thickness, according to the outline of FIG. 1 (1,7=glass sheets of 2 mm thickness; 2, 6=PVB of 0,75 mm in thickness; 3, 5=coatings as per Example 7; 4=polycarbonate of 5 mm in thickness).

The lamination was carried out as in the case of cellular sheets, following the process as disclosed in preceding Examples 24–26.

Three transparent laminates were obtained, free from faults, and with a light transmission of 78%.

The three items were dipped in boiling water for two hours, they were then exposed to U.V. rays, using a Xenon lamp of 150 W for 100 hours, then the boiling step was repeated for a further 2 hours.

At the end of the treatment, the samples were examined to verify the presence of unbindings, possible development of opacity points, development of bubbles, and so on. In no cases were delaminations observed, in one case over three small isolated bubbles were produced of a diameter of 1–2 mm in the central areas; in all cases, the opacity areas were limited within one cm from the edge of the laminate, where the adhesive is kept in direct contact with water.

EXAMPLE 28

Starting from sheets of polycarbonate of dimensions of 50 cm×50 cm, coated with the compositon 9 as in preceding Example, multilayer laminated items were prepared with glass layers and layers of polyvinyl butyral.

Such items, as this Example demonstrates, are useful as transparent windows resistant to the ballistic impact of light weapons.

The items consisted of the following layers:
(1) A sheet of not toughened glass, thickness 6 mm;
(2) a layer of PVB of 0.75 mm of thickness;
(3) a glass sheet of 6 mm;
(4) a layer of 0.75 mm of PVB:
(5) a glass sheet of 8 mm;
(6) a layer of 2.2 mm of PVB;
(7) a polycarbonate sheet of 5 mm, coated with the composition No. 9 of Example 16 (R).

Figure 2:
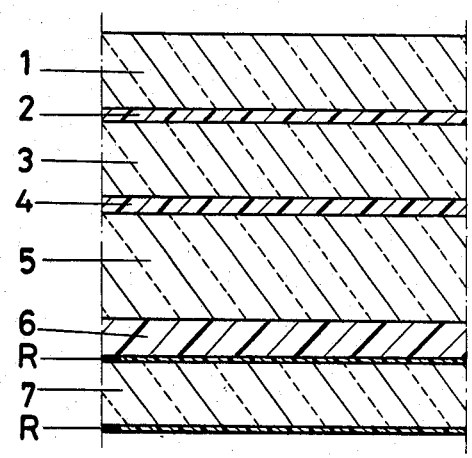

For clearness sake, the arranging of the layers in these items is shown in FIG. 2.

On such multilayer "glasses" tests were carried out of resistance to ballistic impact of projectiles shot by light weapons.

To this purpose the multilayer items were mounted on a frame, kept fixed in their seat by means of four screw fasteners positioned in the four corners. The frame was installed on hinges, so as to be capable of acting as a window of a closed steel box.

By so doing, the multilayer items acts as the "glass" of the window, the polycarbonate layer being faced to-wards the inside of the box.

Inside the box, through a slot a certifying paper was introduced to verify the possible projection of very fine splinters inside the box.

The results of the ballistic tests are reported in Table VI.

In no cases, even with more powerful weapons, did perforation of the laminates occur; they moreover withstood repeated shots, thus demonstrating their usefulness.

The complete absence of splinters must be emphasized. In the case of more powerful weapons, the projectiles deform the polycarbonate, which "reacts" to the shots deforming in a "plastic" way; this demonstrates that the mechanical properties of the organic polymer have not been compromised.

TABLE I

| Example | Type of composition | Age of composition (days) | Transmittance (%) X | Adhesion (%) | Abrasion strength (H %) XX | Resistance to acetone (30') |
|---|---|---|---|---|---|---|
| 5 | 1 | 30 | 89 | 99 | 3.2 | + |
| 6 | 1 | 90 | 91.2 | 100 | 2.9 | + |
| 7 | 2 | 30 | 90.2 | 100 | 1.8 | + |
| 8 | 2 | 90 | 89.5 | 100 | 1.65 | + |
| 9 | 5 | 30 | opaque areas | 60 | — | (−) |
| 10 | 6 | 30 | 89 | 97 | 6 | + |

TABLE I-continued

| Example | Type of composition | Age of composition (days) | Transmittance (%) X | Adhesion (%) | Abrasion strength (H %) XX | Resistance to acetone (30') |
|---|---|---|---|---|---|---|
| 11 | 6 | 90 | 83 | 0 | — | (−) |

(#) On not coated polycarbonate the value of 18.3 was obtained.
(##) The transmittance of not coated specimens was of 86.5% in the average.

TABLE II

| | | | PC | | PMMA | | PST | |
|---|---|---|---|---|---|---|---|---|
| | Type of Composition | Age of Composition | Adhesion | Appearance | Adhesion | Appearance | Adhesion | Appearance |
| Example 12 | 7 | 30 | 100 | Transparent | 98–100 | Transparent | 95–100 | Transparent |
| Example 13 | 7 | 90 | 100 | Transparent | 100 | Transparent | 100 | Transparent |
| Example 14 | 8 | 30 | 30–50 | Transparent | 30 | Opalescent | 30 | Opalescent |
| Example 15 | 8 | 90 | 0 | Opalescent | 0 | Opalescent | 0 | Opalescent |

Properties of the coating on polycarbonate (PC), polymethylmethacrylate (PMMA) polystyrene (PST)

TABLE III

Adhesion of organosiloxane coatings on PC after exposure in W-O-M

| | Composition of primer | (0 hours) | (250 hours) | (500 hours) |
|---|---|---|---|---|
| Example 16 | 9 | 100 | 100 | 100 |
| Example 17 | 10 | 90–95 | 70–80 | 0 |
| Example 18 | 11 | 90–100 | 50–60 | 0 |
| Example 19 | No primer | 0 | — | — |

TABLE IV

Adhesion of SiO2 deposited under vacuum on polycarbonate coated with primer coating

| | Composition of primer | Adhesion % | Abrasion resistance after 750 cycles (Haze %) |
|---|---|---|---|
| Example 20 | 7 | 98–100 | 2.2 |
| Example 21 | 9 | 100 | 1.9 |
| Example 22 | 8 | 50–100 | 8 |
| Example 23 | no primer | Complete spontaneous delamination | — |

TABLE V

Stability of laminates PC (cellular sheet)/PVB/glass to thermal and moisture cycles

| | Coating on PC | Laminate appearance | No. of cycles with delamination |
|---|---|---|---|
| Example 24 | 1 (Ex. 1) | Transpar. | 60 |
| Example 25 | 5 (Ex. 9) | Transpar. | 14 |
| Example 26 | No | Opaque | 1.5 |

TABLE VI

Resistance to ballistic shot of multipayer glasses laminated with polycarbonate

| Type of weapon | Energy of projectile at start (kgm) | Shooting distance (m) | Number of shorts | Perforations |
|---|---|---|---|---|
| Revolver 44 Magnum | 120 | 3 | 6(1) | No perforations |
| FAL gun | 366 | 10 | 3(2) | No perforations |

(1)Impact points were spaced apart by 8 cm; an all-glass laminate of equal thickness is perforated at the third shot.
(2)Impact points were spaced apart by 20 cm; only one shot of FAL is enough for perforating an all-glass laminate of the same thickness.

We claim:

1. Organosiloxane compositions for producing abrasion resistant and adhesion promoting protective coatings of soft substrates, said composition comprising a reaction product of:

(A) an organo-alkoxysilane of general formula (1)

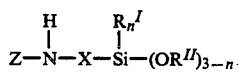

in which:

X is a divalent radical selected among aryl or alkylene radicals of from 1 to 10 carbon atoms;

R' is a radical selected from the group consisting of monovalent hydrocarbon radicals, halogenated saturated or unsaturated alkyl or aryl radicals and hydrogen;

R" is hydrogen or a radical, selected from the group consisting of monovalent halogen-substituted hydrocarbon, alkyl, alkenyl, cycloalkyl, and aryl radicals n has a value of from 0 to 2, Z is selected from the group consisting of hydrogen, monovalent alkyl radicals and radicals containing a second nitrogen-bearing functional group and (B) polyoxymethylenes of the general formula (2)

in which

R' and R" are alkyl or hydrogen and in which m is from 6 to 100 or a cyclic oxymethylene, wherein the weight ratio of (A) to (B) is 100 parts A to from 3 to 12 parts (B); and said reaction product is diluted with a solvent (C) comprising a monocarboxylic organic acid or a mixture of monocarboxylic acid and an inorganic acid, silicic acid or a hydroxyacid of general formula (4)

in which:

M is selected from the group consisting of boron, silicon, phosphorus, titanium, aluminum, zirconium, tin, antimony and arsenic m+n has a value of 3 or 4, R is selected from the group consisting of an alkyl of from 1 to 4 carbon atoms, a hydrogen, and an acyl radical wherein the organosiloxane reaction product is obtained by reacting (A) with (B) under a moisture free inert atmosphere that is maintained between 5 and 30 centipoise at 27° C., and diluting the reaction product of (A) and (B) in a bath consisting of a solvent (C) containing a monocarboxylic organic acid such that the end product composition has a pH value in the range of from 3 to 6.

2. A composition as claimed in claim 1, wherein (A) is selected from the group consisting of 3-aminopropyl-triethoxysilane, aminomethyl-triethoxy-silane, 2-aminoethyl-aminopropyl-trimethoxysilane, and 2-aminoethyl-aminopropyl-methyldiethoxysilane.

3. A composition as claimed in claim 1, wherein (B) is trioxane or paraformaldehyde.

4. A composition as claimed in claim 1, wherein (C) is selected from the group consisting of halogen substituted an unsubstituted hydroxyacids, aldehydic acids, and ketonic acids of from 1 to 4 carbon atoms.

5. A composition as claimed in claim 4, wherein (C) is preferably selected from the group consisting of formic acid, acetic acid, chloroacetic acid, dichloracetic acid, trichloracetic acid, fluoroacetic acid, difluoroacetic acid, trifluoroacetic acid, glyoxylic acid and glycolic acid.

6. A composition as claimed in claim 1, wherein the inorganic acid of (C) is selected from the group consisting of phosphoric acid, boric acid, and silicic acid.

7. A composition as claimed in claim 1, wherein the molar ratio, of (B) to all nitrogen present, (B)/N, is between 0.15 and 1.2.

8. A composition as claimed in claim 7, wherein the molar ratio (B)/N is in the range of from 0.45 to 0.99.

9. A composition as claimed in claim 1, wherein reaction between (A) and (B) takes place in the presence of a solvent selected from the group consisting of ethers, aliphatic and cycloaliphatic hydrocarbons, esters, amides, alkyl-alkoxysilanes of general formula

in which n, R' and R" have the same meanings as defined for (A), and alkyl-alkoxysilanes.

10. A composition as claimed in claim 1, wherein the reaction between (A) and (B) takes place at temperatures in the range of from 5° to 70° C.

11. A composition as claimed in claim 1, wherein the reaction between (A) and (B) takes place at temperatures in the range of from 12° C. to 50° C.

12. A composition as claimed in claim 1, wherein the reaction between (A) and (B) takes place for a time of from 30 minutes to 5 hours.

13. A composition as claimed in claim 1, wherein the solvent containing (C) is selected from the group consisting of ethers, alcohols, aliphatic hydrocarbons and cycloaliphatic hydrocarbons, fluorinated hydrocarbons, silanes, and blends thereof.

14. A composition as claimed in claim 13, wherein the solvent is an aliphatic alcohol of from 1 to 5 carbon atoms.

15. A composition as claimed in claim 1, wherein the ratio of all carboxyl acid equivalents to nitrogen atoms, (—COOH)/N, is in the range of 0.75 to 2.5.

16. A composition as claimed in claim 15, wherein the ratio of all carboxyl acid equivalents to nitrogen atoms, (—COON)/N, is in the range of from 1.2 to 2.

17. A composition as claimed in claim 1, wherein the inorganic acid of (C) is present in an amount such that the atomic ratio between M and all present nitrogen, M/N, is in the range of from 0 to 0.39.

18. A composition as claimed in claim 1, wherein the soft substrate is selected from the group consisting of aromatic polycarbonates, aliphatic polycarbonates, polyacrylates, polymethacrylates, polyesters, cellulose esters, polyacetals, polyamides, polyvinyl chloride, polysulphones, polyethersulphones, polystyrenes, and copolymers of styrene with acrylonitrile and acrylonitrile-butadiene.

19. A composition as claimed in claim 18, wherein the soft substrate is selected from the group consisting of poly-(diphenyl-2,2'-propane-carbonate), poly-(diethylene glycolbisallyl-carbonate), polymethylmethacrylate, poly-(ethylene terephatlate), cellulose acetate, cellulose propanoate, and cellulose butanoate.

20. An item made of a soft material coated with a coating consisting of a composition as claimed in claim 1.

21. An item made of a soft material coated with a primer coating consisting of a composition as claimed in claim 1.

22. An item as claimed in claim 21, wherein said item has a form selected from the group consisting of a flat or curved plate, film, sheet, and cellular sheets.

23. Substantially transparent laminated items consisting of at least one glass sheet and of at least one sheet of soft substrate, bound by means of plasticized thermoplastic adhesives, wherein the soft substrate is coated with a composition as claimed in claim 1.

24. Substantially transparent laminated items, consisting of two or more sheets of soft substrate, bound by means of plasticized thermoplastic adhesives, wherein the soft substrate is coated with a composition as claimed in claim 1.

25. Substantially transparent laminated items as claimed in claim 23, wherein the plasticized thermoplastic adhesive is plasticized polyvinylbutyral.

26. Substantially transparent laminated items as claimed in claim 24, wherein the plasticized thermoplastic adhesive is plasticized polyvinylbutyral.

27. Substantially transparent laminated items, as claimed in claim 24, wherein the soft substrate has the form of a cellular sheet.

28. Organosiloxane compositions for producing abrasion resistant and adhesion promoting protective coatings of soft substrates, said composition comprising a reaction product of:

(A) an organo-alkoxysilane of general formula (1)

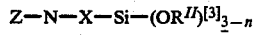

in which:
X is a divalent radical selected from the group consisting of aryl or alkylene radicals of from 1 to 10 carbon atoms;
$R^I$ is a radical selected from the group consisting of saturated or unsaturated alkyl radicals of from 1 to 8 carbon atoms, phenyl and hydrogen;
$R^{II}$ is hydrogen or an alkyl radical of from 1 to 8 carbon atoms, n has a value of 0 or 1, Z is selected from the group consisting of hydrogen, monovalent alkyl radicals and amino alkyl radicals;

(B) polyoxymethylenes of the general formula (2)

in which

R' and R" are alkyl or hydrogen and in which m is from 6 to 100 or a cyclic oxymethylene, wherein the weight ratio of (A) to (B) is 100 parts A to from 2 to 12 parts (B); and said reaction product is diluted with a solvent (C) comprising a monocarboxylic organic acid or a mixture of monocarboxylic acid and an inorganic acid, silicic acid or a hydroxyacid of general formula (3):

in which

M is selected from the group consisting of boron, silicon, phosphorus, titanium, aluminum, zirconium, tin, antimony and arsenic, m+n has a value of 3 or 4, R is selected from the group consisting of an alkyl of from 1 to 4 carbon atoms, a hydrogen, and an acyl radical wherein the organosiloxane reaction product is obtained by reacting (A) with (B) under a moisture free inert atmosphere that is maintained between 5 and 30 centipoise at 27° C., and diluting the reaction product of (A) and (B) in a bath consisting of a solvent (C) containing a monocarboxylic organic acid or a mixture of monocarboxylic organic acid and an inorganic acid such that the end product composition has a pH value in the range of from 3 to 6.

29. A composition as claimed in claim 28, wherein the molar ratio, of (B) to all nitrogen present, (B)/N, is between 0.15 and 1.2.

30. A composition as claimed in claim 28, wherein the ratio of all carboxyl acid equivalents to nitrogen atoms, (—COOH)/N, is in the range of 0.75 to 2.5.

31. A composition as claimed in claim 28, wherein the inorganic acid of (C) is present in an amount such that the atomic ratio between M and all present nitrogen, M/N, is in the range of 0 to 0.39.

32. An item made of a soft material coated with a coating consisting of a composition as claimed in claim 28.

33. An item as claimed in claim 32, wherein said item has a form selected from the group consisting of a flat or curved plate, film, sheet, and cellular sheets.

34. Substantially transparent laminated items consisting of at least one glass sheet and of at least one sheet of soft substrate, bound by means of plasticized thermoplastic adhesives, wherein the soft substrate is coated with a composition as claimed in claim 28.

35. Organosiloxane compositions for producing abrasion resistant and adhesion promoting protective coatings of soft substrates, said composition comprising a reaction product of:

(A) an organo-alkoxysilane selected from the group consisting of:
3-aminopropyl-triethoxysilane;
aminomethyl triethoxysilane; and
2-aminomethyl-aminopropyl-trimethoxysilane; and (B) a polyoxymethylene selected from the group consisting of paraformaldehyde and trioxane;

wherein the mole ratio of (A) to (B) is 1 mole of A to 0.45 to 0.99 moles of B; and said reaction product is diluted with a solvent (C) comprising a combination of acetic acid and phosphoric or boric acid wherein the organosiloxane reaction product is obtained by reacting (A) with (B) under a moisture free inert atmosphere that is maintained between 5 and 30 centipoise at 27° C., and diluting the reaction product of (A) and (B) in a bath consisting of a solvent (C) in aqueous methanol or ethanol such that the end product composition has a pH value in the range of from 3 to 6.

* * * * *